United States Patent
Park et al.

(10) Patent No.: US 9,158,392 B2
(45) Date of Patent: Oct. 13, 2015

(54) TOUCH PEN WITH TILT CORRECTION

(71) Applicant: Samsung Electronics Co., Ltd., Gyeonggi-do (KR)

(72) Inventors: Myeong-Sil Park, Gyeonggi-do (KR); Sung-Soo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/846,290

(22) Filed: Mar. 18, 2013

(65) Prior Publication Data

US 2013/0285990 A1    Oct. 31, 2013

(30) Foreign Application Priority Data

Mar. 22, 2012    (KR) .................. 10-2012-0029295

(51) Int. Cl.
  *G06F 3/033*    (2013.01)
  *G06F 3/0354*   (2013.01)
  *G06F 3/046*    (2006.01)

(52) U.S. Cl.
  CPC ............ *G06F 3/03545* (2013.01); *G06F 3/046* (2013.01)

(58) Field of Classification Search
  CPC ... G06F 3/03545; G06F 3/046; G06F 3/0418; G06F 3/044; G06F 2203/04101
  USPC ........... 345/173, 174, 179; 178/18.02, 19.01, 178/19.03
  See application file for complete search history.

(56) References Cited

U.S. PATENT DOCUMENTS

| | | | | |
|---|---|---|---|---|
| 4,418,242 A * | 11/1983 | Kouno | ................ | 178/18.07 |
| 4,577,057 A * | 3/1986 | Blesser | ................ | 178/19.01 |
| 4,939,318 A * | 7/1990 | Watson et al. | ................ | 178/18.02 |
| 4,975,546 A * | 12/1990 | Craig | ................ | 178/19.06 |
| 5,134,689 A | 7/1992 | Murakami et al. | | |
| 5,248,855 A * | 9/1993 | Cambridge | ................ | 178/19.01 |
| 5,414,227 A * | 5/1995 | Schubert et al. | ................ | 345/179 |
| 5,557,076 A * | 9/1996 | Wieczorek et al. | ................ | 178/18.03 |
| 5,565,632 A * | 10/1996 | Ogawa | ................ | 73/862.69 |
| 5,693,914 A * | 12/1997 | Ogawa | ................ | 178/18.07 |
| 5,748,110 A * | 5/1998 | Sekizawa et al. | ................ | 341/5 |
| 5,751,229 A * | 5/1998 | Funahashi | ................ | 341/5 |
| 6,778,167 B2 * | 8/2004 | Ohashi | ................ | 345/173 |
| 6,801,192 B2 * | 10/2004 | Fujitsuka et al. | ................ | 345/179 |
| 7,456,826 B2 * | 11/2008 | Jurisch et al. | ................ | 345/179 |
| 7,929,736 B2 * | 4/2011 | Bechtel | ................ | 382/124 |
| 8,569,636 B2 * | 10/2013 | Yeh et al. | ................ | 178/18.02 |
| 8,638,320 B2 * | 1/2014 | Harley et al. | ................ | 345/179 |
| 2002/0041272 A1 * | 4/2002 | Ohashi | ................ | 345/173 |
| 2005/0024346 A1 * | 2/2005 | Dupraz et al. | ................ | 345/179 |
| 2005/0104870 A1 * | 5/2005 | Jurisch et al. | ................ | 345/179 |
| 2008/0106520 A1 * | 5/2008 | Free et al. | ................ | 345/173 |
| 2008/0115981 A1 * | 5/2008 | Bechtel | ................ | 178/19.01 |
| 2012/0019488 A1 * | 1/2012 | McCarthy | ................ | 345/179 |
| 2012/0037433 A1 * | 2/2012 | Yeh et al. | ................ | 178/18.02 |
| 2012/0327042 A1 * | 12/2012 | Harley et al. | ................ | 345/179 |
| 2013/0009907 A1 * | 1/2013 | Rosenberg et al. | ................ | 345/174 |
| 2013/0088465 A1 * | 4/2013 | Geller et al. | ................ | 345/179 |
| 2014/0009445 A1 * | 1/2014 | Kim et al. | ................ | 345/179 |
| 2014/0078105 A1 * | 3/2014 | Son | ................ | 345/174 |

* cited by examiner

*Primary Examiner* — Lun-Yi Lao
*Assistant Examiner* — Peter D McLoone
(74) *Attorney, Agent, or Firm* — The Farrell Law Firm, P.C.

(57) ABSTRACT

A touch pen is provided. The touch pen is configured such that an indication point, which is indicated on a touch panel when the touch pen slantingly contacts the touch panel, is corrected to a contact point of the touch pen.

15 Claims, 7 Drawing Sheets

TOUCH PEN WITH TILT CORRECTION

PRIORITY

This application claims priority under 35 U.S.C. §119(a) to Korean Application Serial No. 10-2012-0029295, which was filed in the Korean Intellectual Property Office on Mar. 22, 2012, the contents of which are incorporated herein by reference.

BACKGROUND OF THE INVENTION

1. Field of the Invention

The present invention relates generally to a touch pen, and more particularly, to a touch pen configured to directly input information to a portable terminal screen.

2. Description of the Related Art

Modern portable terminals such as navigation systems, Personal Data Assistants (PDAs), Motion Pictures Experts Group (MPEG)—Layer Audio 3 (MP3) players, Portable Multimedia Players (PMPs), electronic books, and tablet Personal Computers (PCs) are generally provided with a touch screen (also referred to as a touch panel). Inputting is executed by touching a keyboard or icons displayed on the touch screen by fingertip. However, as inter-icon spaces or icons become smaller, many malfunctions may be caused when a user touches the icons or keyboard with a fingertip.

For example, both a point adjacent to the intended touch point and the intended touch point are touched, or although the user has touched the intended touch point, a point adjacent to the touched position may be recognized first, causing a function which is not desired by the user to be executed.

In order to solve these problems, touch pens of various types are used. For example, a stylus is configured to press a touch screen to operate a keyboard or the like, and a conductive material or resonance frequency is configured to touch a desired position on the touch screen, thereby measuring a fluctuation of electrostatic capacity.

A constant pressure type touch pen, such as a stylus pen, continuously applies a constant pressure to the touch screen whenever the touch pen touches the touch panel. Accordingly, there is a problem of damage to the touch panel, which is frequently touched by the touch pan, and when the touch pen touches a damaged position on the touch panel, the touch is not recognized well or an error is produced. For this reason, there has been an increase in the use of more stable touch pens, such as the touch pen disclosed in Korean Unexamined Patent Publication No. 10-2009-0091631 published on Aug. 28, 2009 and entitled, Capacitive Touch Pen, which will now be described.

FIG. 1 illustrates an electromagnetic field distribution when a conventional touch pen with a resonance circuit vertically contacts a touch panel. Referring to FIG. 1, the touch pen 10, which uses a resonance circuit, includes a body 11 with a tip 12 adapted to contact a touch panel 20, a ferrite core 13, and a board (not shown) are provided inside of the body 11, in which a coil 14 is wound around the ferrite core 13. The components inside of the touch pen 10 including the ferrite core 13 wound with the coil 14 form a resonance circuit (not shown) that causes resonance at a frequency delivered from the touch panel 20. Accordingly, it is possible to obtain the positional information or writing pressure information of the touch pen 10 through a detected value transmitted or received between the touch panel 20 and the touch pen 10 using an induced electromotive force produced from the resonance circuit inside of the touch pen 10.

FIG. 2 illustrates an electromagnetic field distribution when the conventional touch pen with the resonance circuit slantingly contacts the touch screen, and FIG. 3 illustrates a touch point touched by the conventional touch pen, and an indicated state of the touch point when the touch pen with the resonance circuit slantingly contacts the touch panel.

Referring to FIGS. 2 and 3, when a user practically uses the touch pen 10, the user uses the touch pen 10 in a slanted state in relation to the touch panel 20, as illustrated in FIG. 2, rather than using the touch pen 10 in a vertically erected state in relation to the touch panel 20, as illustrated in FIG. 1. Thus, when used in this slanted state, the position of the induced electromotive force produced from the components inside of the touch pen 10 is adjacent to the touch panel 20. As such, the position of the central axis C of the electromagnetic field M produced due to the contact of the touch pen 10 is displaced to be spaced away to the slanted direction of the touch pen 10 from the contact point A of the touch pen 10, as illustrated in FIG. 2. Accordingly, although the tip 12 of the touch pen 10 contacts the position of point A on the touch panel 20, the central axis C of the electromagnetic field M is produced at the position of point B, and an indication produced when the tip 12 of the touch pen 10 contacts point B appears.

Thus, as illustrated in FIG. 3, the contact point A contacted by the touch pen 10 is not indicated but a contact to another point B adjacent to the contact point A is recognized, and point B is indicated at a position of the central axis C of the electromagnetic field. Accordingly, there arises a problem in that when the touch pen 10 is contacted to execute an icon at a desired position, such as the position of point A, another icon instead of the icon at the desired position is executed, such as an icon at the position of point B, thereby executing an undesired operation. In addition, when the user writes or draws a picture with the touch pen 10, it is difficult for the user to determine an intended position because the position contacted by the tip 12 of the touch pen 10 on the touch panel 20 and the position indicated on the touch panel 20 become disparate, thereby visually confusing the user.

Due to the error between the contact point A and the indication point B, a user cannot rely on the contact of the touch pen 10. Furthermore, due to the difference caused between the contact point A and the indication point B, the indication point B is obscured by the touch pen 10 or the user's hand, and the user inconveniently has to continuously confirm whether the touch pen 10 is correctly contacted.

SUMMARY OF THE INVENTION

Accordingly, an aspect of the present invention is to solve at least the above-described problems occurring in the prior art, and to provide at least the advantages described below.

Another aspect of the present invention is to provide a touch pen which is configured such that when the touch pen is slantingly connected with a touch panel, for example, when a figure is drawn or a letter is written on the touch panel, an indication is correctly presented at a position on the touch panel where the touch pen contacts the touch panel.

In accordance with another aspect of the present invention, a touch pen is configured such that an indication point, which is indicated on a touch panel when the touch pen slantingly contacts the touch panel, is corrected to a contact point of the touch pen.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described in detail with reference to the accompanying drawings. In the following description, a detailed description of known functions and configurations incorporated herein will be omitted when it may obscure the subject matter of the present invention.

Figure 1:
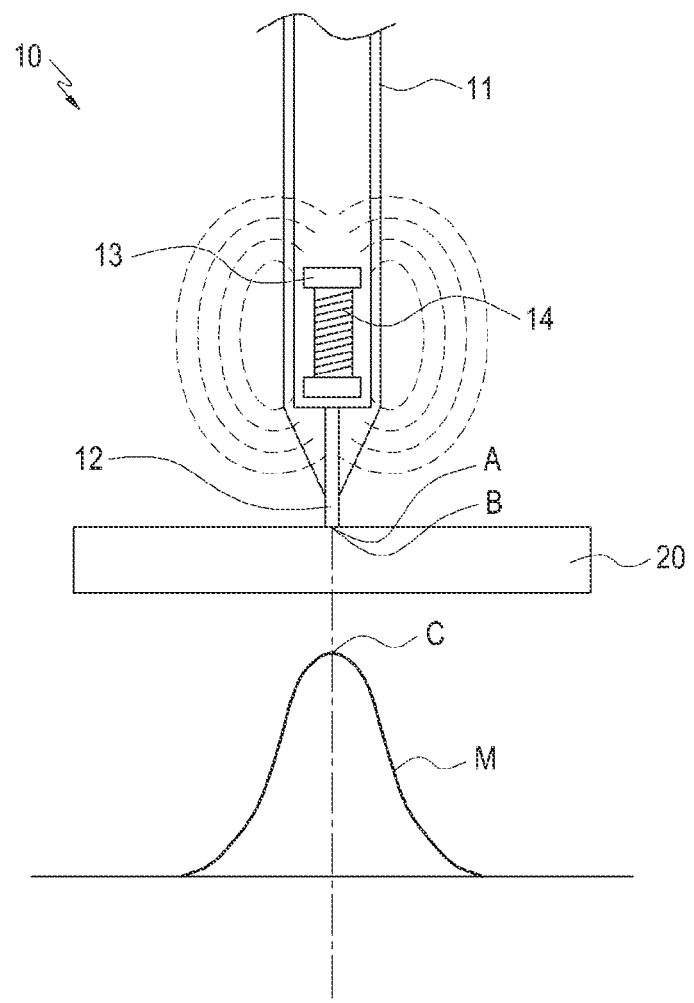
FIG. 1 illustrates an electromagnetic field distribution when a conventional touch pen with a resonance circuit vertically contacts a touch panel.
Figure 2:
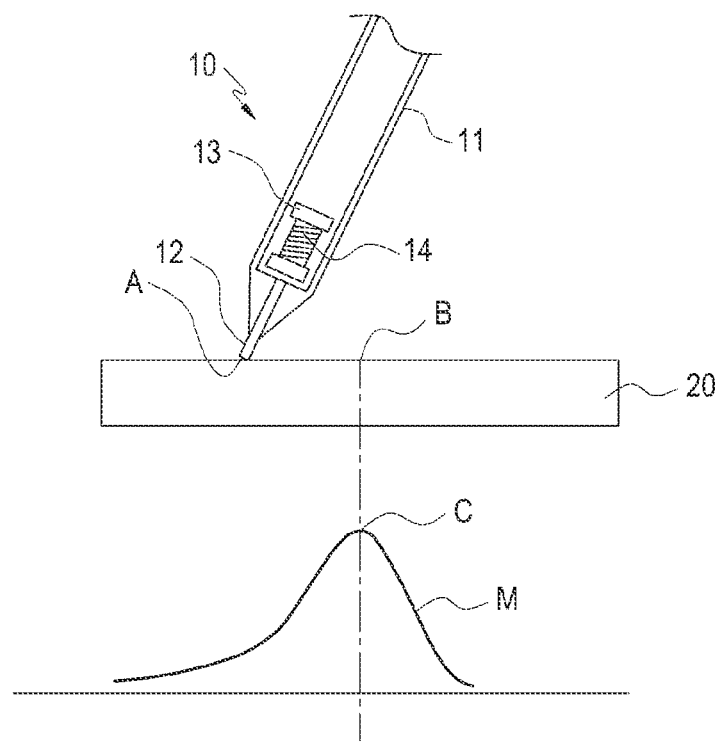
FIG. 2 illustrates an electromagnetic field distribution when the conventional touch pen with the resonance circuit slantingly contacts the touch screen.
Figure 3:
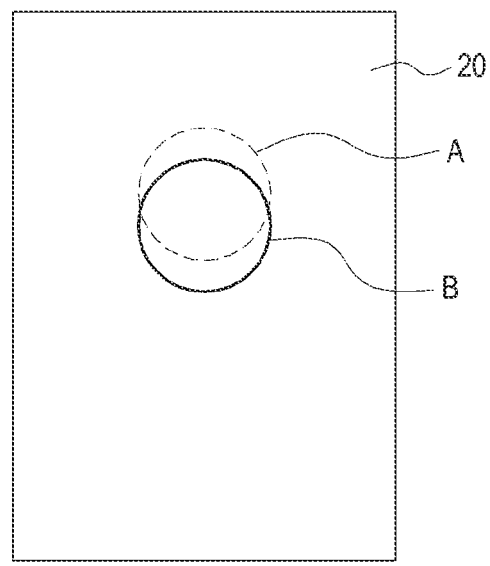
FIG. 3 illustrates a touch point touched by the conventional touch pen, and an indicated state of the touch point when the conventional touch pen with the resonance circuit slantingly contacts the touch panel.
Figure 4:
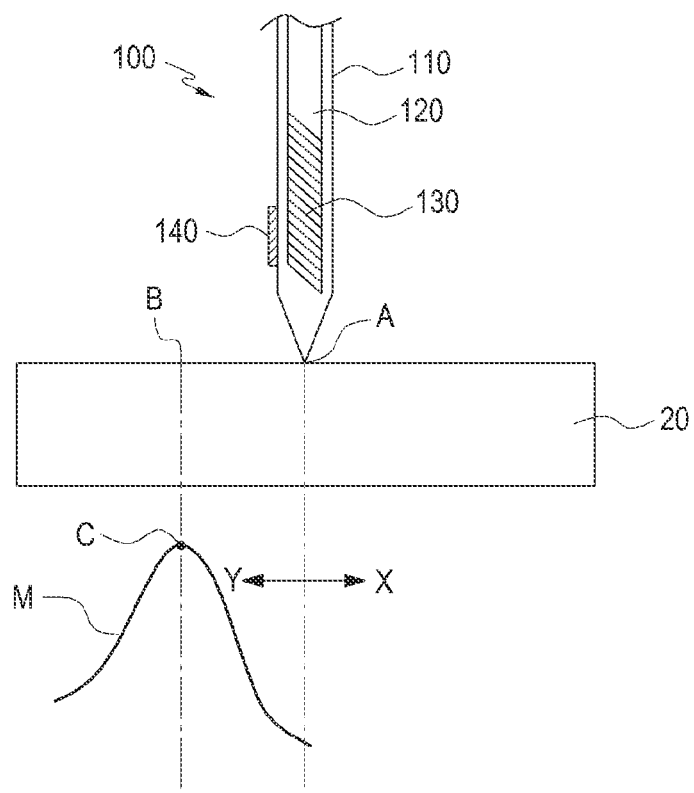
FIG. 4 illustrates an electromagnetic field distribution in a touch pen according to an embodiment of the present invention when the touch pen vertically contacts a touch screen.
Figure 5:
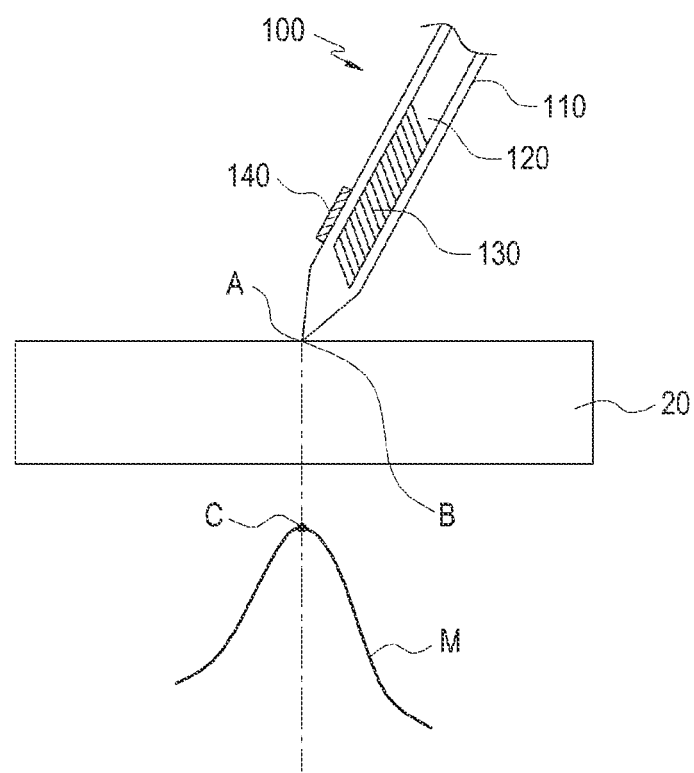
FIG. 5 illustrates an electromagnetic field distribution in the touch pan according to the embodiment of the present invention when the touch pen slantingly contacts the touch screen.

FIG. 4 illustrates an electromagnetic field distribution in a touch pen according to an embodiment of the present invention when the touch pen vertically contacts a touch screen, and FIG. 5 illustrates an electromagnetic field distribution in the touch pan according to the embodiment of the present invention when the touch pen slantingly contacts the touch screen.

Referring to FIGS. 4 and 5, the touch pen 100 with a resonant circuit is provided with a resonance circuit (not shown) inside thereof, so that the resonance circuit causes resonance at a frequency to produce an induced electromotive force when the touch pen 100 contacts a touch panel 20. More specifically, a correcting member which includes a ferrite coil 120, around which a coil 130 to be described later is wound, and a condenser (not shown) are provided inside of the touch pen 100. As the touch pen 100 contacts the touch panel 20, an induced electromotive force is produced between the touch pen 100 and the touch panel 20, which in turn produces an electromagnetic field M.

When the electromagnetic field M is produced, an indication point B according to a contact of the touch pen 100 is indicated at the position where the peak value of the electromagnetic field M is produced (hereinafter, the position will be referred to as the central axis C of electromagnetic field M). Particularly, when the touch pen 100 of the present embodiment slantingly contacts the touch panel 20, the central axis C of the electromagnetic field M is adapted to be formed at a contact point A of the touch pen 100, whereby a correction is made in such a manner that the indication point B is indicated at the contact point A of the touch pen 100.

Specifically, when the touch pen 100 vertically contacts the touch panel 20, the central axis C of the produced electromagnetic field M is formed to be spaced away from the contact point A of the touch pen 100 in the upward direction by a distance, wherein with reference to the vertically contacted state of the touch pen 100, the upward direction indicates a direction (hereinafter, referred to as a second direction Y) opposite to a direction (hereinafter, referred to as a first direction X) where the touch pen 100 is slanted toward the touch panel 20. However, when the user contacts the touch pen 100 slantingly with the touch panel 20 in a natural writing position, the central axis C of the electromagnetic field M thereby produced conforms to the contact point A of the touch pen 100.

When the user vertically contacts the touch pen 100 according to the present embodiment with the touch panel 20, the indication point B indicated on the touch panel is indicated to be spaced by 0.5 mm to 1.0 mm from the contact point A of the touch pen 100. However, if the touch panel 100 slantingly contacts the touch panel 20, for example, with an angle of 30° to 60° such as an ordinary writing posture, the indication point B indicated on the touch panel 20 is indicated to conform to the contact point A of the touch panel 100. Accordingly, when the touch pen 100 slantingly contacts the touch panel 20, the central C axis of the electromagnetic field M is corrected to be formed on the contact point A of touch pen 100.

Although the slanting angle when the touch pen 100 contacts the touch panel 20 is described as 30° to 60° in the present embodiment by way of an example, the present invention is not limited to this. The slanting angle of the touch pen 100 contacting with touch panel 20 is adjustable according to an asymmetric shape of the ferrite core 120, according to the off-centered extent of the center of the ferrite core 120.

Figure 6:
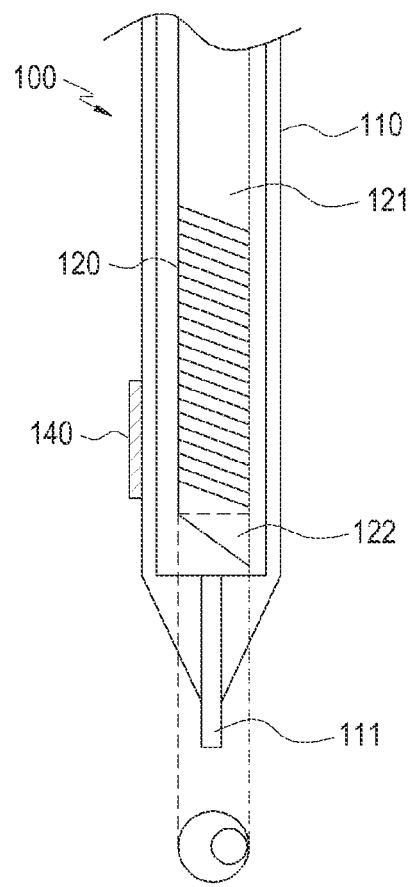
FIG. 6 illustrates a touch pen according to another embodiment of the present invention, in which a ferrite core provided in the touch pen is different from that in the touch pen illustrated in FIG. 4.

FIG. 6 illustrates a touch pen according to another embodiment of the present invention, in which a ferrite core provided in the touch pen is different from that in the touch pen illustrated in FIG. 4. Referring to FIG. 6, the touch pen 100 includes a body 110, a ferrite core 120, and a coil 130.

The body 110 is formed in a hollow shape such that a ferrite core 120 wound with a coil 130 and an internal circuit board (not shown) may be provided therein. In addition, an indication unit 140 is formed on the outside of the body 110 to allow a user to recognize the off-centered direction of the ferrite core 120 asymmetrically formed in the first direction X.

The ferrite core 120 is formed from a magnetic material, and the coil 130 is wound around the outer periphery of the ferrite core 120. The central part of the ferrite core 120 is coupled with a tip 111 of the touch pen 100, in which the tip 111 is adapted to be contacted with the touch panel 20, and extends through the ferrite core 120 to be coupled with a condenser (not shown). Accordingly, when the tip 111 of the touch pen 100 contacts the touch panel 20, the capacitance of the condenser is changed, and an electromagnetic field M is produced between the touch pen 100 and the touch panel 20. The ferrite core 120 is formed asymmetrically to be off-center in relation to the first direction X where the touch pen 100 is slanted.

As the ferrite core 120 is formed asymmetrically to be off-center in relation to the first direction X, the central axis C of the electromagnetic field M produced when the touch pen 100 contacts the touch panel 20 is changed in its produced position depending on whether the touch pen 100 contacts the touch panel 20 vertically or slantingly. That is, when the touch pen 100 contacts the touch panel 20 vertically, the central axis C of the electromagnetic field M is formed to be spaced away from the contact point A to the second direction Y due to an off-center position of the ferrite core 120. However, when the touch pen 100 slantingly contacts the touch panel 20, the central axis C of the electromagnetic field M is formed on the contact point A.

Accordingly, as the ferrite core 120 is formed asymmetrically to be off-center in relation to the first direction X, when the touch pen 100 slantingly contacts the touch panel 20, the position of the central axis C of the electromagnetic field M is corrected in such a manner that the position of the indication point B conforms to the contact point A of the slanted touch pen 100. That is, as the ferrite core 120 is formed asymmetrically to be off-center in relation to the first direction where the touch pen 100 approaches to the touch panel 20 from the central axis of the body 110, it becomes possible to correct the central axis C of the electromagnetic field M, which is produced at the contact point A in the prior art only when the touch panel 20 and the touch pen 100 are contacted with each other at right angles, in such a manner that the central axis C of the electromagnetic field M is produced at the contact point A even when the touch panel 20 slantingly contacts the touch pen 100.

In the present embodiment, the ferrite core 120 formed asymmetrically to be off-center in relation to the first direction X includes a first body part 121 and a second body part 122. The first body part 121 is formed symmetrically with reference to the central axis of the body 110 of the touch pen 100. The second body part 122 is formed at an end of the first body part 121 integrally with the first body part 121 to be tapered to a side, thereby causing the ferrite core 120 to be off-center in relation to the first direction X.

Figure 7:
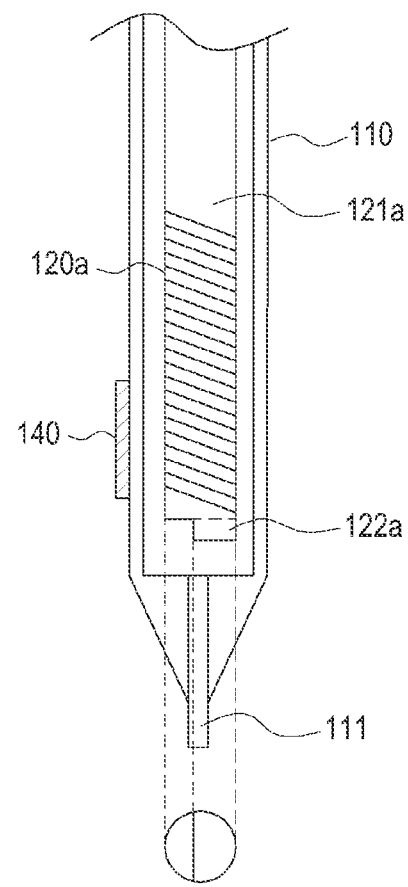
FIG. 7 illustrates a touch pen according to another embodiment of the present invention in which a ferrite core is different from that inside of the touch pen illustrated in FIG. 4.

FIG. 7 illustrates a touch pen according to another embodiment of the present invention in which a ferrite core is different from that in the touch pen illustrated in FIG. 4. Referring to FIG. 7, the ferrite core 120*a* formed asymmetrically to be off-center in relation to the first direction X in the present embodiment includes a first body part 121*a* and a second body part 122*a*. The ferrite core 120*a* is different from the ferrite core 120 in terms of the second body part 122*a*. That is, although the second body part 122 of the ferrite core 120 in the above-described embodiment is formed to be tapered, the second body part 122*a* of the ferrite core 120*a* in the present embodiment is formed at an end of the first body part 121*a* to be integrated with the first body part 121*a* but to be stepped. Thus, the center of the ferrite core 120*a* is off-center in relation to the first direction X. For example, the second body part 122*a* protrudes in a semi-circular shape to the first direction with reference to the first body part 121*a* so that the center of the ferrite core 120*a* is off-center in relation to the first direction X.

As illustrated in FIGS. 6 and 7, although the ferrite core 120 or 120*a* has been described as being separated into the first body part 121 or 121*a* and the second body part 122 or 122*a*, the present invention is not limited to this and may be variously changed without a limitation if configured such that the center of the ferrite core 120 or 120*a* is off-center in relation to the first direction X. In addition, although it has been described that the second body part 122 or 122*a* has a tapered shape or a stepped shape to be off-center in relation to the first direction X, the present invention is not limited to this, and may be variously changed if configured such that the center of the ferrite core 120 is off-center in relation to the first direction X.

On the outer periphery of the body 110, an indication unit 140 is provided to allow the user to recognize the gripping direction of the touch pen 100. With reference to the off-center position of the ferrite core 120 off-center in relation to the first direction X, the indication unit 140 may be positioned to be oriented to the off-centered direction or the direction opposite to the off-centered direction, so that the user can recognize the gripping position of the touch pen 100 or the direction to slant the touch pen 100 with reference to the indication unit 140. That is, the user can easily recognize which direction the touch pen 100 should be slanted to in order to cause the contact point A of the touch pen 100 conform to the indication point B.

The indication unit 140 may be provided in the off-centered direction or the direction opposite to the off-centered direction. For example, when the indication unit 140 is positioned on the outside of the body 110 in the off-centered direction, the user may confirm the position of the indication unit 140, and then slant the touch pen 100 to the first direction X, so that the indication point B is positioned at the user side. That is, the user may grip the touch pen 100 in such a manner that the indication unit 140 is oriented toward the user's palm side, more specifically toward the slanting direction of the touch pen 100. If the user is right-handed, the indication unit 140 will be positioned between the palm's valley part and the back of user's hand and between the thumb and the index finger of the right hand. If the user is a left hander, the indication unit 140 will be positioned between the palm's valley part and the back of user's hand and between the thumb and the index finger of the left hand.

When the touch pen 100 slantingly contacts the touch panel 20, the central axis C of the electromagnetic field M is formed on the contact point A of the touch pen 100, so that the indication point B is indicated on the contact point A. When the indication unit 140 is indicated on the outside of the body 110 in the direction opposite to the off-centered direction, the user may confirm the position of the indication unit 140, and then position the indication point B at the side away from the user. That is, the indication unit 140 is provided at a surface contacted by the user's thumb or index finger or at a surface contacted by both of the user's thumb and index finger.

When the user grips the touch pen 100 in such a manner that the user's thumb or index finger slantingly contacts the indication unit 140, and then contacts the touch pen 100 with the touch panel 20 at a slanting angle, the central axis C of the electromagnetic field M is formed at the contact point A of the touch pen 100 so that the indication B can be indicated on the contact point A of the touch pen 100.

Although a button may operate as the indication unit 140, the present invention is not limited to this. For example, plural bumps may be formed on the indication unit 140 to allow the user to tactually recognize the off-centered direction of the ferrite core 120, or the indication unit 140 may have a different color than the color of the body 110 to allow the user to recognize the off-centered direction of the ferrite core 120.

Accordingly, when the user grips and uses the touch pen 100 at a slanted angle of 30° to 60° according to the user's normal writing position after confirming the position of the indication unit 140, the tip 111 of the touch pen 100 contacted with the touch panel 20 conforms to the indication point B. Accordingly, the user can conveniently use the touch pen 100 as if the user writes on paper with an ordinary pen. Even when the touch pen 100 is used in the state where it slantingly contacts the touch panel 120, the indication point B is presented on the contact point A, thereby improving the reliability of the touch pen 100.

Hereinafter, another embodiment of the present invention will be described for correcting the central axis C of the electromagnetic field M to be poisoned on the contact point A when the touch pen 100 slantingly contacts the touch panel 20.

Figure 8:
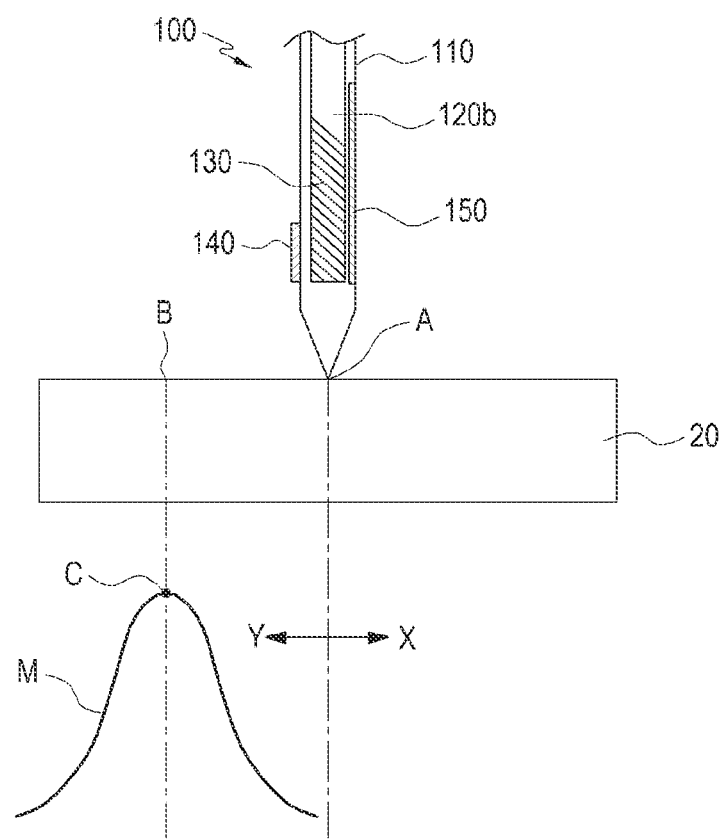
FIG. 8 illustrates a touch pen according to another embodiment of the present invention, in which the touch pen is provided with a conductive member inside thereof unlike the touch pen illustrated in FIG. 4.

FIG. 8 illustrates a touch pen according to another embodiment of the present invention, in which the touch pen is provided with a conductive member inside thereof, unlike the touch pen illustrated in FIG. 4. Referring to FIG. 8, a conductive member 150 is installed inside of the touch pen 100 to ensure that when the touch pen 100 slantingly contacts the touch panel 20, the central axis C of the electromagnetic field M produced due to the contact of the touch pen 100 is positioned at the tip 111 of the touch pen 100 so that the indication point B can be indicated on the contact point A of the touch pen 100. More specifically, the present embodiment is different from the touch pens 100 of the above-described embodiments due to the shape of the ferrite core 120 and the existence of the conductive member 150. The touch pen 100 according to the present embodiment includes a body 110, a ferrite core 120 wound with a coil 130, and a conductive member 150.

The body 110 is formed in a hollow shape so that the ferrite core 120 and the conductive member 150 can be installed within the body 110. The ferrite core 120 and the conductive member 150 will be described later. The ferrite core 120 is formed symmetrically with reference to the central axis of the body 110, and a core 130 is wound around the outer periphery of the ferrite core 120.

The conductive member 150 is provided adjacent to the ferrite core 120 inside of the body 110, in particular, on an area of the inner periphery of the body 110 in the first direction X where the touch pen 100 approaches the touch panel 20. An indication unit 140 is formed on the outer periphery of the body 110 to allow the user to recognize that the conductive member 150 is formed in the first direction X. The indication unit 140 is formed in the direction where the conductive member 150 is provided or in the direction opposite to the conductive member 150 to allow the user to recognize the direction in which the touch pen 100 should be slanted.

Figure 9:
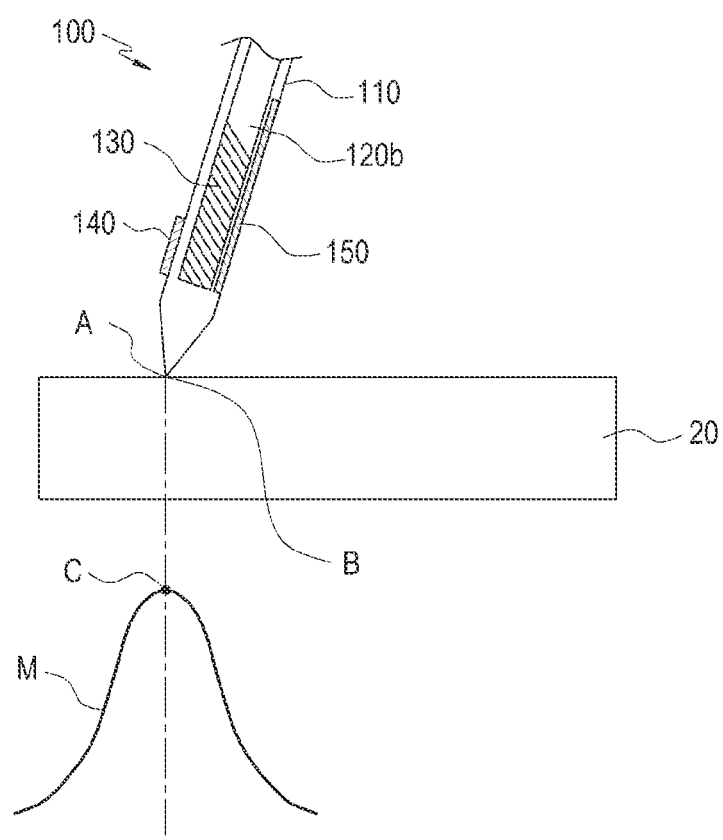
FIG. 9 illustrates a touch pen of FIG. 8 in a slanted position.

For example, if the indication unit 140 is provided in the direction where the conductive member 150 is provided, the user may confirm the position of the indication unit 140 and then grip the touch pen 100 in such a manner that the indication point B is directed to the user's palm side, more specifically toward the slanting direction of the touch pen 100. In this state, if the touch pen 100 slantingly contacts the touch panel 20, as shown in FIG. 9, the central axis C of the electromagnetic field M is formed on the contact point A of the touch pen 100, so that the indication point B can be indicated on the contact point A of the touch pen 100.

In addition, if the indication unit 140 is provided in the direction opposite to the conductive member 150, the user may confirm the position of the indication unit 140, and then grip the touch pen 100 in such a manner that the indication unit 140 is disposed between the thumb and the index finger. In this state, if the touch pen 100 slantingly contacts the touch panel 20 at a slanting angle, as shown in FIG. 9, the central axis C of the electromagnetic field M is formed at the contact point A of the touch pen 100 so that the indication B can be indicated on the contact point A of the touch pen 100.

Although a button may operate as the indication unit 140, the present invention is not limited to this. For example, plural bumps may be formed on the indication unit 140 to allow the user to tactually recognize the position of the conductive member 150, or the indication unit 140 may have a different color than the color of the body 110 to allow the user to recognize the position of the conductive member 150.

Accordingly, when the touch pen 100 vertically contacts the touch panel 20, the central axis C of the electromagnetic field M is produced to be spaced away from the contact point A of the touch pen 100 to the upward direction, i.e., to the second direction Y where the touch pen 100 is slanted to approach the touch panel 20. However, when the touch pen 100 slantingly contacts the touch panel 20, the central axis C of the electromagnetic field M is formed on the contact point A due to the contact member 150, and the indication point B is indicated on the contact point A.

More specifically, when the touch pen 100 vertically contacts the touch panel 20, the central axis C of the electromagnetic field M is spaced from the contact point A of the touch pen 100 by 0.5 mm to 1.0 mm. However, if the touch panel 100 slantingly contacts the touch panel 20 with an angle of 30° to 60°, the central axis C of the electromagnetic field M is positioned to conform to the contact point A of the touch pen 100.

Accordingly, when the user grips and uses the touch pen 100 slantingly at a slanted angle of 30° to 60° according to the user's normal writing position after confirming the position of the indication unit 140, the tip 111 of the touch pen 100 contacted with the touch panel 20 conforms to the indication point B. Accordingly, the user can conveniently use the touch pen 100 as if the user writes on paper with an ordinary pen. Even when the touch pen 100 is used in the state where it slantingly contacts the touch panel 20, the indication point B is presented on the contact point A, thereby improving the reliability of the touch pen 100.

As discussed above, when the touch pen slantingly touches the touch panel, the present invention causes an indication point indicated on the touch panel to conform to the contact point of the touch pen. Accordingly, the user can correctly input the intended information.

In addition, because the user is allowed to confirm the information input on the touch screen, the reliability for the contact of the touch pen is improved.

Furthermore, because the user may not use the touch pen vertically on the touch screen, and may use the touch pen as if the user writes on paper using an ordinary writing tool, user fatigue is reduced and convenience is improved.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A touch pen, wherein the touch pen is configured such that an indication point, which is indicated on a touch panel when the touch pen slantingly contacts the touch panel, is corrected to a contact point of the touch pen,
    wherein the indication point is indicated on a central axis of an electromagnetic field which is produced as a result of the touch pen contacting the touch panel,
    wherein the touch pen comprises a correcting member, which is off-centered relative to a central axis of a body of the touch pen in a first direction where the touch pen approaches the touch panel, and
    wherein an indication unit is provided on the touch pen in a second direction opposite to the first direction for allowing a user to determine an off-centered direction relative to the central axis of the body.

2. The touch pen of claim 1, wherein the touch pen comprises:
    a ferrite core positioned inside of the body; and
    a coil wound around an outer periphery of the ferrite core,
        wherein the ferrite core is formed asymmetrically to be off-center in relation to a first direction where the touch pen is slanted from the central axis of the body to approach the touch panel.

3. The touch pen of claim 2, wherein the ferrite core comprises:
a first body part formed symmetrically with reference to the central axis of the body; and
a second body part integrally provided at an end of the first body part, and biased to the first direction.

4. The touch pen of claim 3, wherein the second body part is formed in a tapered manner relative to the first direction.

5. The touch pen of claim 3, wherein the second body part is formed at the end of the first body part in a stepped manner relative to the first direction.

6. The touch pen of claim 2, wherein an outer periphery of the body is provided with an indication unit that is configured to indicate an off-centered direction of the ferrite core.

7. The touch pen of claim 6, wherein the indication unit comprises a button protruding from the outer periphery of the body.

8. The touch pen of claim 2, wherein when the touch pen vertically contacts the touch panel, the central axis of the electromagnetic field is produced to be spaced away from the contact point to a direction opposite to the first direction where the touch pen is slanted to approach the touch panel, and wherein when the touch pen slantingly contacts the touch panel, the central axis of the electromagnetic field is indicated to be engaged with the contact point.

9. The touch pen of claim 8, wherein when the touch pen is arranged vertically in relation to the touch panel, the central axis of the electromagnetic field is spaced from the indication point by 0.5 millimeters to 1.0 millimeters, and wherein when the touch pen is arranged slantingly at a slanting angle of 30 degrees to 60 degrees in relation to the touch panel, the indication point and the central axis of the electromagnetic field conform to each other.

10. A touch pen, wherein the touch pen is configured such that an indication point, which is indicated on a touch panel when the touch pen slantingly contacts the touch panel, is corrected to a contact point of the touch pen,
wherein the indication point is indicated on a central axis of an electromagnetic field which is produced as a result of the touch pen contacting the touch panel, and
wherein the touch pen comprises a correcting member, which is off-center relative to a central axis of a body of the touch pen in a first direction where the touch pen approaches the touch panel and asymmetrical relative to a central axis of the body in a second direction that is perpendicular in the first direction,
wherein the touch pen comprises:
the body;
a ferrite core positioned inside of the body; and
a coil wound around an outer periphery of the ferrite core, wherein the ferrite core is formed asymmetrically to be off-center in relation to the first direction where the touch pen is slanted from the central axis of the body to approach the touch panel,
wherein the ferrite core comprises:
a first body part formed symmetrically with reference to the central axis of the body; and
a second body part integrally provided at an end of the first body part, and biased to the first direction,
wherein the second body part is formed in a tapered manner relative to the first direction.

11. A touch pen, wherein the touch pen is configured such that an indication point, which is indicated on a touch panel when the touch pen slantingly contacts the touch panel, is corrected to a contact point of the touch pen, wherein the indication point is indicated on a central axis of an electromagnetic field which is produced as a result of the touch pen contacting the touch panel, and
wherein the touch pen comprises a correcting member, which is off-center relative to a central axis of a body of the touch pen in a first direction where the touch pen approaches the touch panel and asymmetrical relative to a central axis of the body in a second direction that is perpendicular in the first direction,
wherein the touch pen comprises:
the body;
a ferrite core positioned inside of the body; and
a coil wound around an outer periphery of the ferrite core, wherein the ferrite core is formed asymmetrically to be off-center in relation to the first direction where the touch pen is slanted from the central axis of the body; to approach the touch panel
wherein the ferrite core comprises:
a first body part formed symmetrically with reference to the central axis of the body; and
a second body part integrally provided at an end of the first body part, and biased to the first direction,
wherein the second body part is formed at the end of the first body part in a stepped manner relative to the first direction.

12. A touch pen, wherein the touch pen is configured such that an indication point, which is indicated on a touch panel when the touch pen slantingly contacts the touch panel, is corrected to a contact point of the touch pen, wherein the indication point is indicated on a central axis of an electromagnetic field which is produced as a result of the touch pen contacting the touch panel, and
wherein the touch pen comprises a correcting member, which is off-center relative to a central axis of a body of the touch pen in a first direction where the touch pen approaches the touch panel and asymmetrical relative to a central axis of the body in a second direction that is perpendicular in the first direction,
wherein the touch pen comprises:
the body;
a ferrite core positioned inside of the body; and
a coil wound around an outer periphery of the ferrite core, wherein the ferrite core is formed asymmetrically to be off-center in relation to the first direction where the touch pen is slanted from the central axis of the body to approach the touch panel
wherein when the touch pen vertically contacts the touch panel, the central axis of the electromagnetic field is produced to be spaced away from the contact point to a direction opposite to the first direction where the touch pen is slanted to approach the touch panel, and
wherein when the touch pen slantingly contacts the touch panel, the central axis of the electromagnetic field is indicated to be engaged with the contact point.

13. A touch pen, wherein the touch pen is configured such that an indication point, which is indicated on a touch panel when the touch pen slantingly contacts the touch panel, is corrected to a contact point of the touch pen,
wherein the indication point is indicated on a central axis of an electromagnetic field which is produced as a result of the touch pen contacting the touch panel,
wherein the touch pen comprises a conductive member, which is off-center relative to a central axis of a body of the touch pen in a first direction where the touch pen approaches the touch panel, and wherein an indication unit is provided on the touch pen in a second direction opposite to the first direction for allowing a user to determine an off-centered direction relative to the central axis of the body.

14. The touch pen of claim 13, wherein the touch pen comprises:
a ferrite core symmetrically disposed inside of the body;
a coil wound around an outer periphery of the ferrite core; and
the conductive member is positioned adjacent to the ferrite core in the first direction.

15. The touch pen of claim 14, wherein an outer periphery of the body is provided with an indication unit that is configured to indicate an off-centered direction, of the ferrite core, in relation to the first direction.

* * * * *